(12) United States Patent
Cvelbar et al.

(10) Patent No.: US 11,624,310 B2
(45) Date of Patent: Apr. 11, 2023

(54) VEHICLE EXHAUST SYSTEM MIXER WITH FLEXIBLE DOSER MOUNT

(71) Applicant: Faurecia Emissions Control Technologies, USA, LLC, Columbus, IN (US)

(72) Inventors: Randall Cvelbar, Columbus, IN (US); Eduardo Alano, Columbus, IN (US); Amee Bhatt, Columbus, IN (US); Amaresh Rakkasagi, Bengaluru (IN); Anthony Burnett, Freetown, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 7 days.

(21) Appl. No.: 16/834,182

(22) Filed: Mar. 30, 2020

(65) Prior Publication Data

US 2021/0301710 A1 Sep. 30, 2021

(51) Int. Cl.
*F01N 13/08* (2010.01)
*F01N 3/28* (2006.01)

(52) U.S. Cl.
CPC ......... *F01N 13/082* (2013.01); *F01N 3/2892* (2013.01); *F01N 2240/20* (2013.01); *F01N 2610/1453* (2013.01)

(58) Field of Classification Search
CPC ............. F01N 2240/20; F01N 2610/02; F01N 3/2066; F01N 3/2892; F01N 13/141; F01N 13/148; F01N 13/16; F01N 13/1805; F01N 2260/20; F01N 2610/1453; F01N 3/208; Y02A 50/20; Y02A 50/2325; Y02T 10/12; Y02T 10/24; B01D 53/9418; B01D 53/944; B01D 53/9477; B01D 2251/2067; B01D 53/9409; B01D 53/94; B01F 2005/0091; B01F 3/04049; B01F 5/0473; B01F 5/0614

See application file for complete search history.

(56) References Cited

U.S. PATENT DOCUMENTS

| | | | |
|---|---|---|---|
| 8,438,839 B2 * | 5/2013 | Floyd | F01N 3/2066 60/286 |
| 2003/0226412 A1 | 12/2003 | Rumminger et al. | |
| 2005/0150211 A1 * | 7/2005 | Crawley | F01N 3/0256 60/272 |
| 2008/0163612 A1 * | 7/2008 | Gaiser | F01N 3/025 60/299 |

(Continued)

FOREIGN PATENT DOCUMENTS

DE 102015110319 A1 10/2016

*Primary Examiner* — Carl C Staubach
*Assistant Examiner* — Diem T Tran
(74) *Attorney, Agent, or Firm* — Carlson, Gaskey & Olds, P.C.

(57) ABSTRACT

A component for a mixer of a vehicle exhaust system, according to an exemplary aspect of the present disclosure includes, among other things, a doser mount comprising a curved body having a center boss with a doser opening defining a doser axis. The curved body includes at least a first mating surface configured to receive a first mixer shell defined by a first dimension and a second mating surface configured to receive a second mixer shell defined by a second dimension different than the first dimension.

26 Claims, 7 Drawing Sheets

(56) References Cited

U.S. PATENT DOCUMENTS

| | | | |
|---|---|---|---|
| 2011/0094206 A1* | 4/2011 | Liu | B01F 3/04049 |
| | | | 60/274 |
| 2012/0174561 A1* | 7/2012 | Troxler | F01N 3/2066 |
| | | | 60/274 |
| 2016/0245142 A1 | 8/2016 | Venkataraghavan et al. | |
| 2016/0319723 A1* | 11/2016 | Alano | B01F 5/0614 |
| 2016/0363027 A1 | 12/2016 | Lorenz et al. | |
| 2018/0023446 A1* | 1/2018 | Dimpelfeld | B01F 23/2132 |
| | | | 60/301 |
| 2019/0101041 A1* | 4/2019 | Willats | F01N 13/148 |
| 2019/0201854 A1* | 7/2019 | Cvelbar | B01D 53/94 |

* cited by examiner

VEHICLE EXHAUST SYSTEM MIXER WITH FLEXIBLE DOSER MOUNT

TECHNICAL FIELD

This disclosure relates generally to a mixer for a vehicle exhaust system.

BACKGROUND

Vehicles include an exhaust system that has catalyst components to reduce emissions. The exhaust system includes an injection system with an injector or doser that injects a diesel exhaust fluid (DEF), or a reducing agent such as a solution of urea and water for example, upstream of a selective catalytic reduction (SCR) catalyst which is used to reduce NOx emissions. A mixer is positioned upstream of the SCR catalyst and mixes engine exhaust gases and products of urea transformation. The injection system includes a doser that sprays the fluid into the exhaust stream. Mixers can have different sizes dependent upon application and available packaging space. A doser mount is needed to attach the doser to a mixer shell. Different doser mounts and configurations are used for different size shells, which proliferates parts and increases cost.

SUMMARY

A component for a mixer of a vehicle exhaust system, according to an exemplary aspect of the present disclosure includes, among other things, a doser mount comprising a curved body having a center boss with a doser opening defining a doser axis. The curved body includes at least a first mating surface configured to receive a first mixer shell defined by a first dimension and a second mating surface configured to receive a second mixer shell defined by a second dimension different than the first dimension.

In a further non-limiting embodiment of the foregoing component, the second dimension is greater than the first dimension.

In a further non-limiting embodiment of any of the foregoing components, the first dimension comprises an inner diameter of the first mixer shell and the second dimension comprises an inner diameter of the second mixer shell.

In a further non-limiting embodiment of any of the foregoing components, the doser mount comprises a single mount to which either the first or second mixer shell is mounted.

In a further non-limiting embodiment of any of the foregoing components, the center boss includes a substantially flat surface that is spaced from the curved body by a shoulder, and wherein the flat surface comprises an attachment interface for a doser configured to inject a fluid through the doser opening.

In a further non-limiting embodiment of any of the foregoing components, each of the first and second mixer shells define a mixer center axis, and including a second shoulder that separates the center boss from the second mating surface and a third shoulder that separates the second mating surface from the first mating surface such that the second mating surface is radially outward of the first mating surface relative to the mixer center axis.

In a further non-limiting embodiment of any of the foregoing components, the first mating surface of the curved body has a first curvature and the second mating surface of the curved body has a second curvature that is greater than the first curvature, and wherein the first and second mating surfaces are staggered such that the second mating surface is radially inward of the first mating surface relative to the doser axis.

In a further non-limiting embodiment of any of the foregoing components, the component includes a plurality of flow elements each having an upstream end fixed to the doser mount and a downstream end, and wherein the plurality of flow elements are attached to each other to form a swirl chamber.

In a further non-limiting embodiment of any of the foregoing components, the plurality of flow elements comprise at least first, second, and third flow elements, and wherein the doser mount includes at least a first flange area extending in an opposite direction from the center boss and at least partially surrounding the doser opening and a second flange area extending at least partially about a peripheral edge of the curved body, and where in the upstream ends of the first and second flow elements are associated with the first flange area and the upstream end of the third flow element is associated with the second flange area.

In a further non-limiting embodiment of any of the foregoing components, the first flow element forms one portion of a swirl chamber and the second flow element forms a remaining portion of the swirl chamber, the first and second flow elements are fixed to each other to substantially surround the doser axis, and wherein the third flow element has an arm portion at the downstream end that is fixed to one of the first and second flow elements and the upstream end of the third flow element is seated against the second flange area, and wherein a first open space is created between an outer surface of the second flow element and an inner surface of the third flow element and a second open space is created between an outer surface of the first flow element and an inner surface of the second flow element.

A vehicle exhaust system component, according to yet another exemplary aspect of the present disclosure includes, among other things, a mixer having an upstream end configured to be connected to an upstream exhaust component and a downstream end configured to be connected to a downstream component. The mixer has a mixer shell providing an internal cavity that surrounds a mixer center axis, and wherein the mixer shell has a doser opening. A doser mount is mounted to the mixer at the doser opening, wherein the doser mount is configured to support a doser that injects a fluid into the internal cavity of the mixer shell. The doser mount comprises a curved body having a center boss with a doser mount opening defining a doser axis, wherein the curved body includes at least a first mating surface configured to receive a first mixer shell defined by a first dimension and a second mating surface configured to receive a second mixer shell defined by a second dimension, and wherein the doser mount comprises a single mount to which either the first or second mixer shell is mounted to provide the mixer shell. A swirl chamber has an upstream end fixed to the doser mount and a downstream end that is open to the internal cavity, and wherein the upstream end is defined by a first outer dimension and the downstream end is defined by a second outer dimension that is greater than the first outer dimension.

In a further non-limiting embodiment of any of the foregoing components, the doser mount has an outer surface that faces an inner surface of the mixer shell and an inner surface that faces the internal cavity, and wherein the first mating surface of the curved body has a first curvature in the outer surface and the second mating surface of the curved body has a second curvature in the outer surface that is greater than the first curvature, and wherein the first and second mating surfaces are staggered such that the second mating surface is radially inward of the first mating surface relative to the doser axis.

In a further non-limiting embodiment of any of the foregoing components, the center boss includes a substantially flat surface that is spaced from the curved body by a shoulder, and wherein the flat surface comprises an attachment interface for the doser.

In a further non-limiting embodiment of any of the foregoing components, a second shoulder separates the center boss from the second mating surface and a third shoulder separates the second mating surface from the first mating surface such that the second mating surface is radially outward of the first mating surface relative to the mixer center axis.

In a further non-limiting embodiment of any of the foregoing components, the swirl chamber is comprised of a plurality of sheet metal stampings each having an upstream end fixed to one or more flanges extending inwardly of the inner surface of the doser and a downstream end that extends into the internal cavity.

A method of assembling a mixer for a vehicle exhaust system according to still another exemplary aspect of the present disclosure includes, among other things: providing a plurality of mixer shells each having an internal cavity that surrounds a mixer axis and each having a doser opening, and wherein the plurality of mixer shells have different sizes; providing a single doser mount having a curved body with a plurality of mating surfaces to receive different size mixer shells; selecting one of the plurality of mixers shells having a desired size; installing the doser mount from within the internal cavity of a selected one of the plurality of mixer shells such that the doser mount extends at least partially outward of the doser opening; and fixing the selected one of the plurality of mixer shells to one of the plurality of matting surfaces that corresponds to the desired size.

In a further non-limiting embodiment of the foregoing method, the plurality of mixer shells have at least a first mixer shell defined by a first dimension and a second mixer shell that is defined by a second dimension that is different from the first dimension, and wherein the plurality of mating surfaces includes at least a first mating surface configured to receive the first mixer shell and a second mating surface configured to receive the second mixer shell, and including defining the first dimension as an inner diameter of the first mixer shell and the second dimension as an inner diameter of the second mixer shell.

In a further non-limiting embodiment of any of the foregoing methods, the doser mount has an outer surface that faces an inner surface of the selected one of the plurality of mixer shells and an inner surface that faces the internal cavity, and the method includes providing the first mating surface of the curved body with a first curvature in the outer surface and the second mating surface of the curved body with a second curvature in the outer surface that is greater than the first curvature, and including staggering the first and second mating surfaces such that the second mating surface is radially inward of the first mating surface relative to a doser axis defined by the doser opening.

In a further non-limiting embodiment of any of the foregoing methods, the center boss includes a substantially flat doser attachment surface in the outer surface that is spaced from the curved body by a shoulder, and the method includes positioning the doser mount such that the center boss extends outwardly of the doser opening in the selected one of the plurality of mixer shells.

In a further non-limiting embodiment of any of the foregoing methods, the method includes installing a swirl chamber within the internal cavity, the swirl chamber being comprised of a plurality of flow elements each having an upstream end fixed to one or more flanges extending inwardly of the inner surface of the doser and a downstream end that extends into the internal cavity.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary inlet reactor for a mixer that provides a single, common or universal doser mount that can be used with mixers having different sizes.

Figure 1:
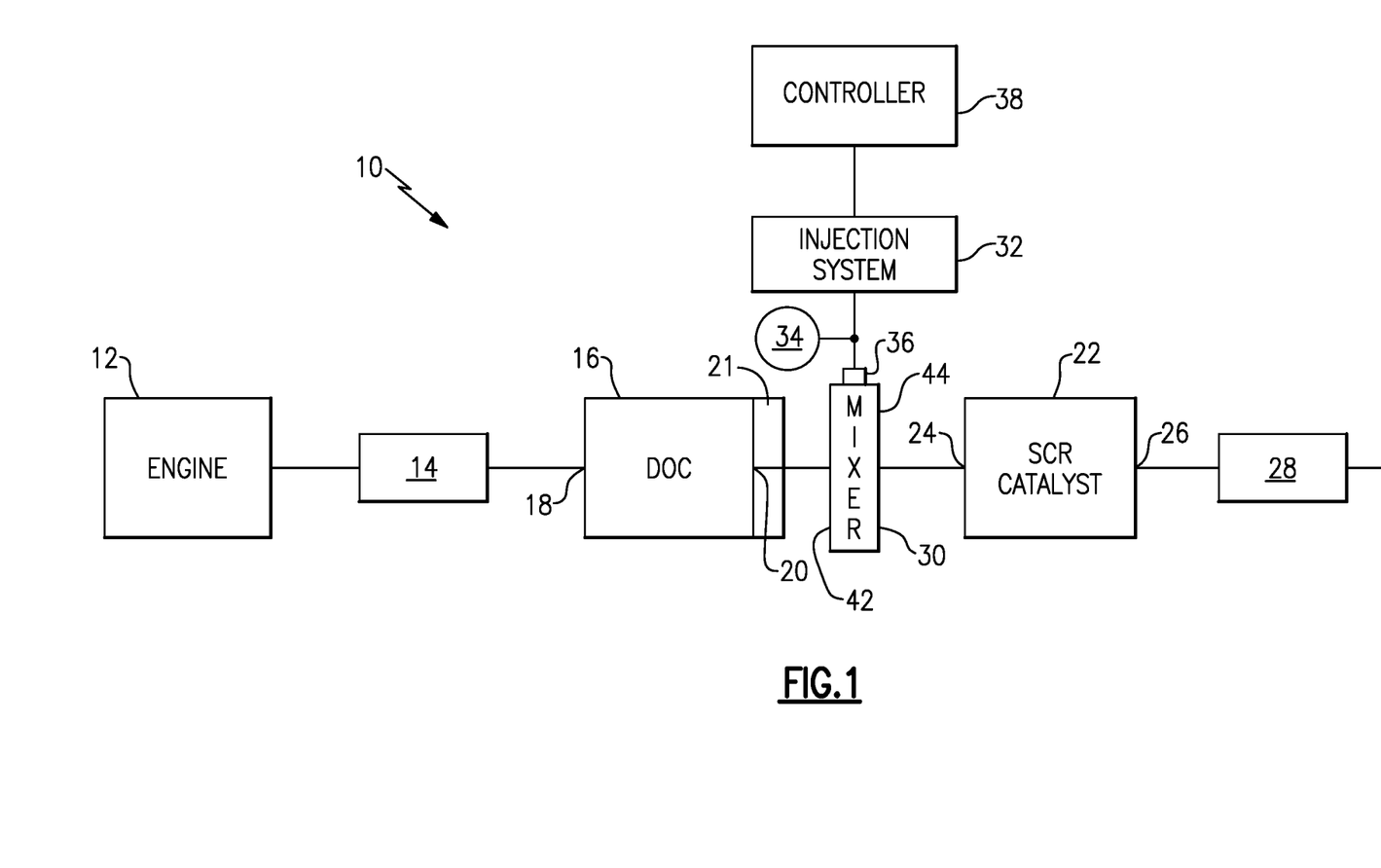
FIG. 1 schematically illustrates one example of a vehicle exhaust system with a mixer according to an exemplary disclosure.

FIG. 1 shows a vehicle exhaust system 10 that conducts hot exhaust gases generated by an engine 12 through various upstream exhaust components 14 to reduce emission and control noise as known. In one example configuration, the upstream exhaust component 14 comprises at least one pipe that directs engine exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28, which eventually exhaust to atmosphere. Optionally, component 22 can comprise a catalyst that is configured to perform a selective catalytic reduction function and a particulate filter function. The various downstream exhaust components 28 can include one or more of the following: pipes, valves, catalysts, mufflers, tailpipes etc. These upstream 14 and downstream 28 components can be mounted in various different configurations and combinations dependent upon vehicle application and available packaging space.

In one example, a mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a reducing agent, such as a solution of urea and water for example, into the exhaust gas stream upstream from the SCR catalyst 22 such that the mixer 30 can mix the urea and exhaust gas thoroughly together via a swirling generated flow. The injection system 32 includes a fluid supply 34, a doser 36 defining a doser axis A, and a controller 38 that controls injection of the urea as known.

The mixer 30 comprises has an inlet end 42 configured to receive the engine exhaust gases and an outlet end 44 to direct a mixture of swirling engine exhaust gas and products transformed from urea to the SCR catalyst 22. Examples of a mixer 30 that can be used in the exhaust system 10 can be found in U.S. Pat. Nos. 8,661,792 and 9,266,075 for example, which are also assigned to the assignee of the present application and are hereby incorporated by reference.

Figure 2:
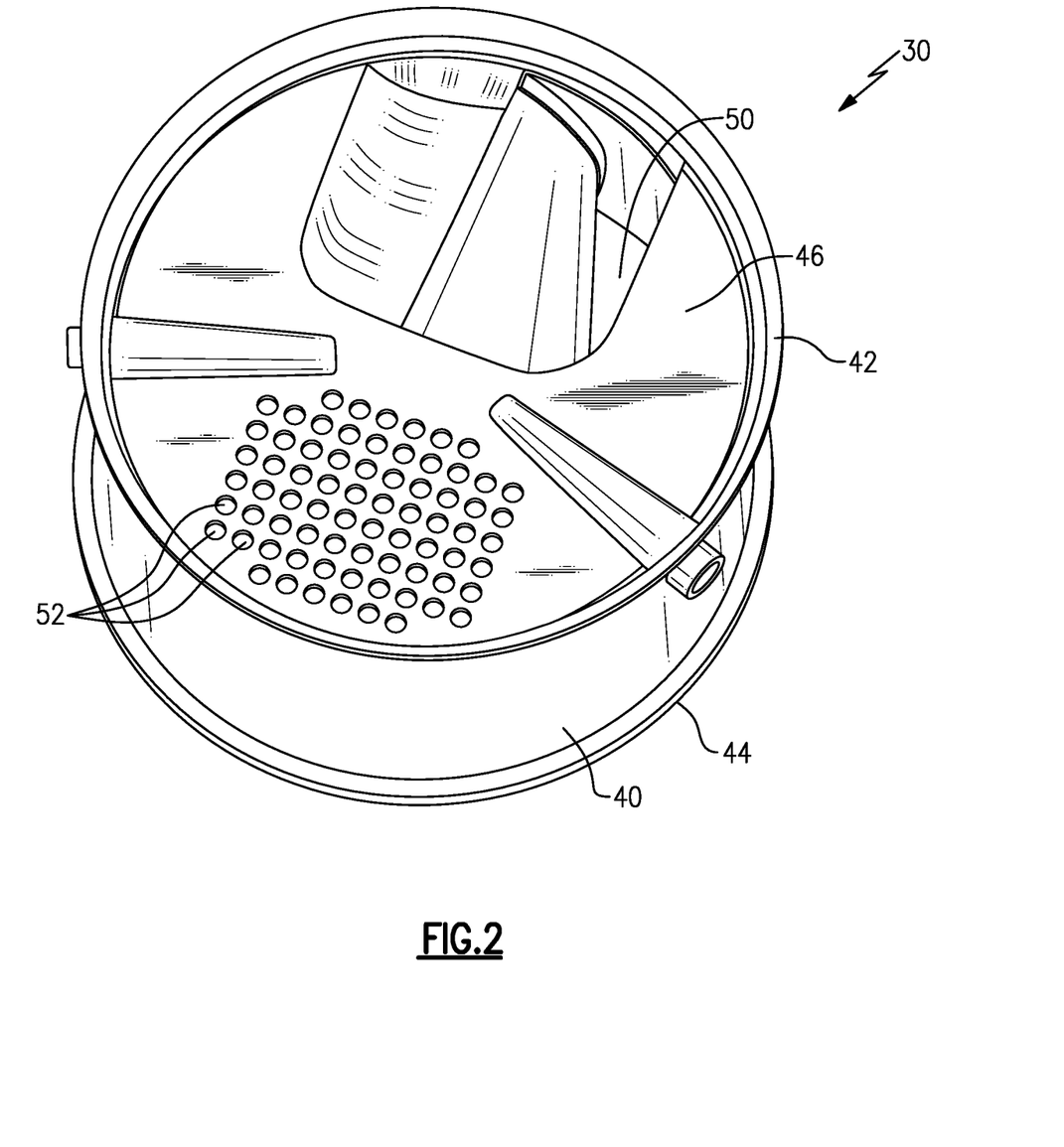
FIG. 2 is an inlet end view of one example of a mixer as used in the vehicle exhaust system of FIG. 1.
Figure 7:
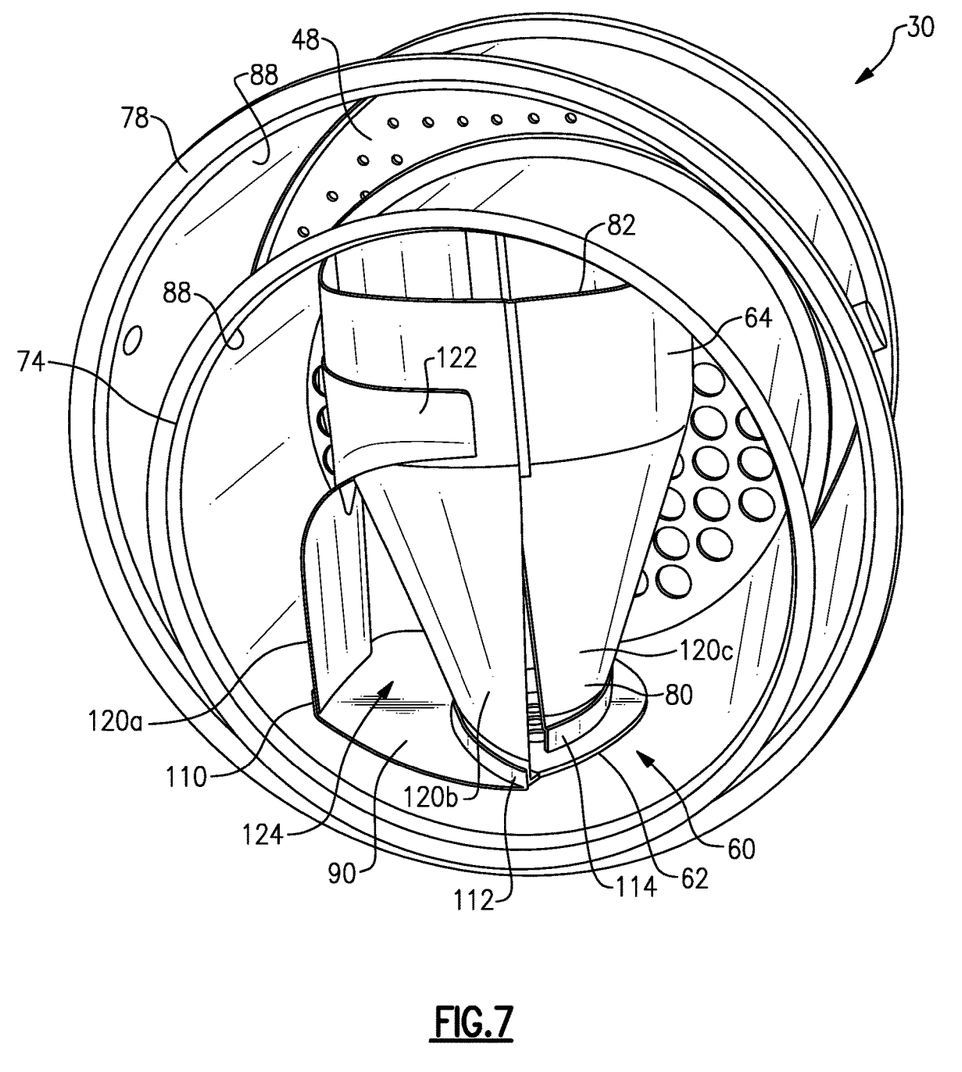
FIG. 7 is an end view of a mixer with an inlet baffle removed and the inlet reactor installed within the internal cavity.

FIG. 2 shows one example of a mixer 30 that includes an inlet baffle 46 and an outlet baffle 48 (FIG. 7). The inlet baffle 46 is at the upstream or inlet end 42 of the mixer 30. The inlet baffle 46 is configured to initiate swirling of the primary exhaust gas flow through the mixer 30. In one example, the inlet baffle 46 includes at least one large inlet opening 50 that receives the majority of the exhaust gas. The inlet baffle 46 also includes a plurality of perforations, slots, or additional inlet openings 52 that ensure optimal homogenization of exhaust gases and reduces back pressure.

Figure 3:
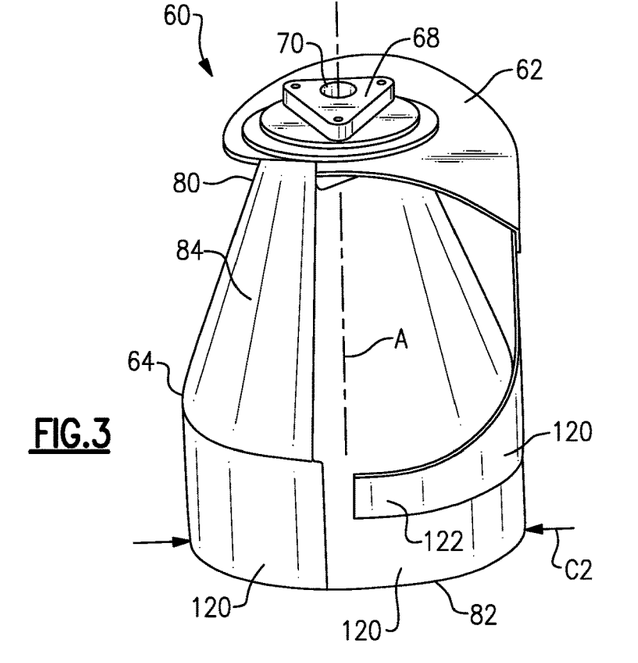
FIG. 3 is a perspective view of an exemplary inlet reactor as used in the mixer of FIG. 2.
Figure 4:
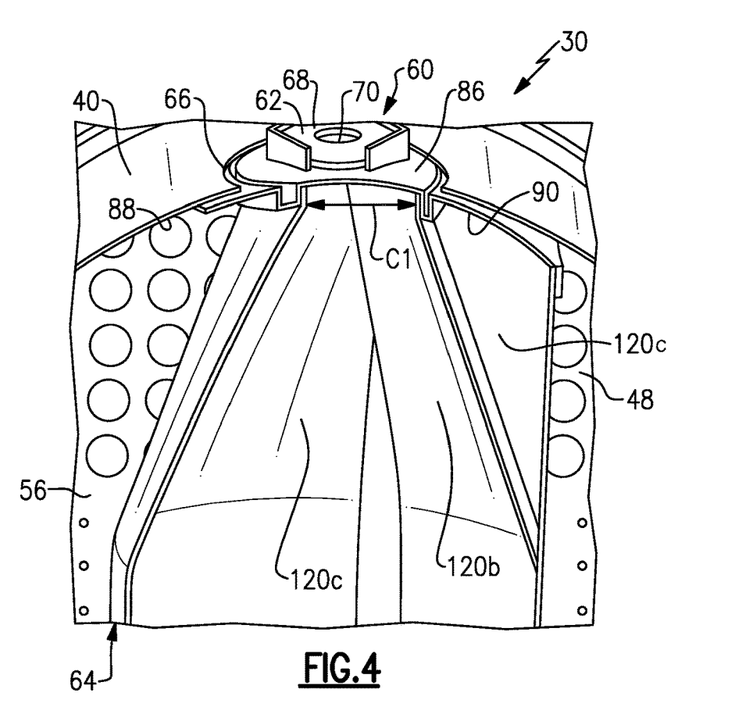
FIG. 4 is a partial section view of the inlet reactor of FIG. 3 as installed within a mixer shell.

The inlet 46 and outlet 48 baffles are fixed to a mixer shell 40 that defines a mixer center axis and provides an internal mixing chamber or internal cavity 56 between the inlet 46 and outlet 48 baffles. Exhaust gas and injected fluid spray, which is injected via the doser 36, are mixed within the internal cavity 56. In one example shown in FIG. 3, an inlet reactor 60 is used to mount the doser 36 relative to the mixer shell. The inlet reactor 60 includes a doser mount 62 and a swirl chamber 64 that extends into the internal cavity 56. The doser mount 62 is mounted to the mixer shell 40 at a doser opening 66 (FIG. 4) formed within the mixer shell 40. The doser mount 62 is configured to support the doser 36 that injects a fluid into the internal cavity 56 of the mixer shell 40.

Figure 5:
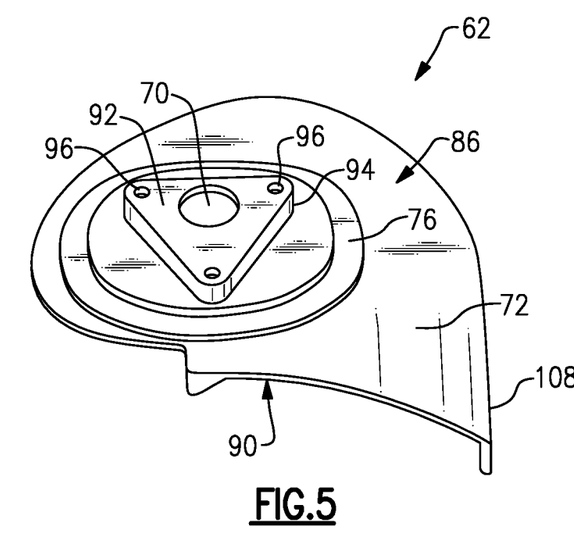
FIG. 5 is a perspective view of a doser mount of the inlet reactor of FIG. 3.
Figure 6:
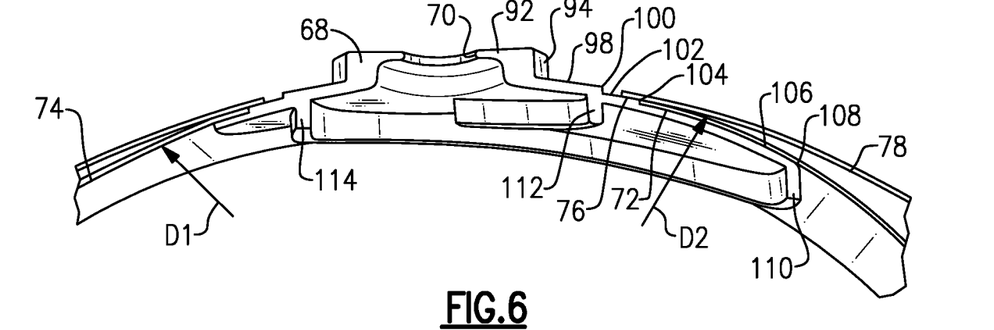
FIG. 6 is a section view of the doser mount of FIG. 5 showing that the doser mount is a single mount that can be used for mixer shells having different sizes.

In one example, the doser mount 62 comprises a curved body having a center boss 68 with a doser mount opening 70 defining a doser axis A. As shown in FIGS. 5-6, the curved body includes at least a first mating surface 72 configured to receive a first mixer shell 74 defined by a first dimension D1 and a second mating surface 76 configured to receive a second mixer shell 78 defined by a second dimension D2. As such, the doser mount 62 comprises a single mount to which either the first 74 or second 78 mixer shell is mounted to provide the mixer shell 40 for the mixer 30. Thus, the single doser mount 62 comprises a common mount that is configured to fit multiple mixer sizes. This eliminates the need to tool up specific doser mounts for each different size mixer and provides for cost reductions.

The swirl chamber 64 has an upstream end 80 fixed to the doser mount 62 and a downstream end 82 that is open to the internal cavity 56. The upstream end 80 is defined by a first outer dimension C1 (FIG. 4) and the downstream end is defined by a second outer dimension C2 (FIG. 3) that is greater than the first outer dimension C1 to form the chamber shape. In one example, the swirl chamber 64 has a constant first outer dimension C1 for a short length and a constant second outer dimension C2 for a longer length. The swirl chamber 64 includes a tapering body portion 84 that tapers or gradually increases in size from the chamber portion with the first outer dimension C1 to the chamber portion with the second outer dimension C2.

The doser mount opening 70 of the doser mount 62 is positioned to overlap the doser opening 66 of the mixer shell 40. Fluid is injected through the aligned openings and into an interior of the swirl chamber 64 to mix with exhaust gas. The mixture of exhaust gas exit and fluid exits the downstream end 82 of the swirl chamber 64 into the internal cavity 56.

In the example shown in FIGS. 5-6, the first dimension D1 comprises an inner diameter of the first mixer shell 74 and the second dimension D2 comprises an inner diameter of the second mixer shell 78 that is greater than the inner diameter of the first mixer shell 74. The doser mount 62 has an outer surface 86 that faces an inner surface 88 of the selected mixer shell 74, 78 and an inner surface 90 that faces the internal cavity 56. The first mating surface 72 of the curved body has a first curvature formed in a portion of the outer surface 86 and the second mating surface 76 of the curved body has a second curvature formed in a portion of the outer surface 86. The second curvature is greater than the first curvature. The first 72 and second 76 mating surfaces are staggered such that the second mating surface 76 is radially inward of the first mating surface 72 relative to the doser axis A. In one example, the mating surface of one of the first and second curvatures extends along a greater circumferential distance of the inner surface 88 of the mixer than the mating surface of the other of the first and second curvatures. In one example shown in FIG. 5, the outer surface of the first mating surface 72 with the first curvature extends along a greater circumferential distance of the inner surface 88 of the mixer than the outer surface of the second mating surface 76 with the second curvature.

In one example, the center boss 68 includes a substantially flat surface 92 in the outer surface 86 that is spaced from the curved body by a shoulder 94. The flat surface 92 comprises an attachment interface for the doser 36. In one example, the attachment interface includes one or more fastener openings 96 spaced outwardly of the doser mount opening 70.

The doser mount 62 includes an outer surface 98 that is radially outward of the shoulder 94 relative to the doser axis A. A second shoulder 100 transitions into a further radially outer surface 102 and a third shoulder 104 transitions into a further radially outer surface 106. The radially outer surface 106 corresponds to the first mating surface 72 and the radially outer surface 102 corresponds to the second mating surface 76.

Along one peripheral portion 108 of the curved body, a first flange 110 extends inwardly toward the internal cavity. A second flange 112 extends inwardly from the inner surface 90 of the doser mount and surrounds at least a portion of the doser mount opening 70. A third flange 114 also extends inwardly from the inner surface 90 of the doser mount and surrounds at least a portion of the doser mount opening 70.

Figure 8:
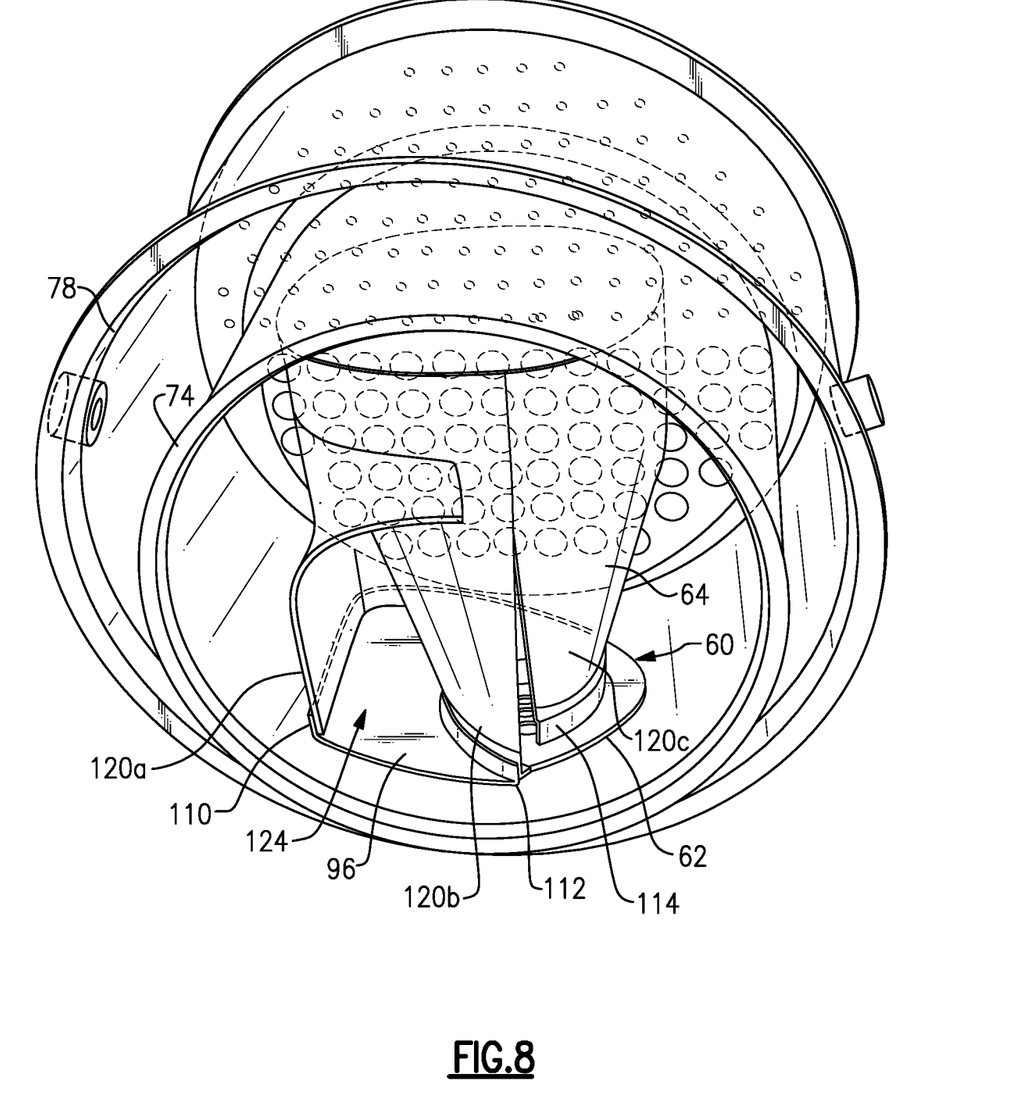
FIG. 8 is similar to FIG. 7 but shows an inner surface of the doser mount in relation to flow elements of the inlet reactor.

In one example, the swirl chamber 64 is comprised of a plurality of flow elements 120 each having an upstream end 80 fixed to the doser mount 62 and a downstream end 82. The plurality of flow elements 120 are attached to each other to form the swirl chamber 64. In one example, the plurality of flow elements 120 comprise at least first 120a, second 120b, and third 120c flow elements. The first flow element 120a is seated against the first flange 110 (FIGS. 7-8). The second flow element 120b is seated against at least the second flange 112 and the third flow element 120c is seated against at least the third flange 114.

In one example, the plurality of flow elements comprise sheet metal stampings that are welded, brazed, or otherwise permanently fixed to the respective flanges 110, 112, 114. The sheet metal stampings are shaped to create a swirling flow centered around the doser spray axis A.

Figure 9A:
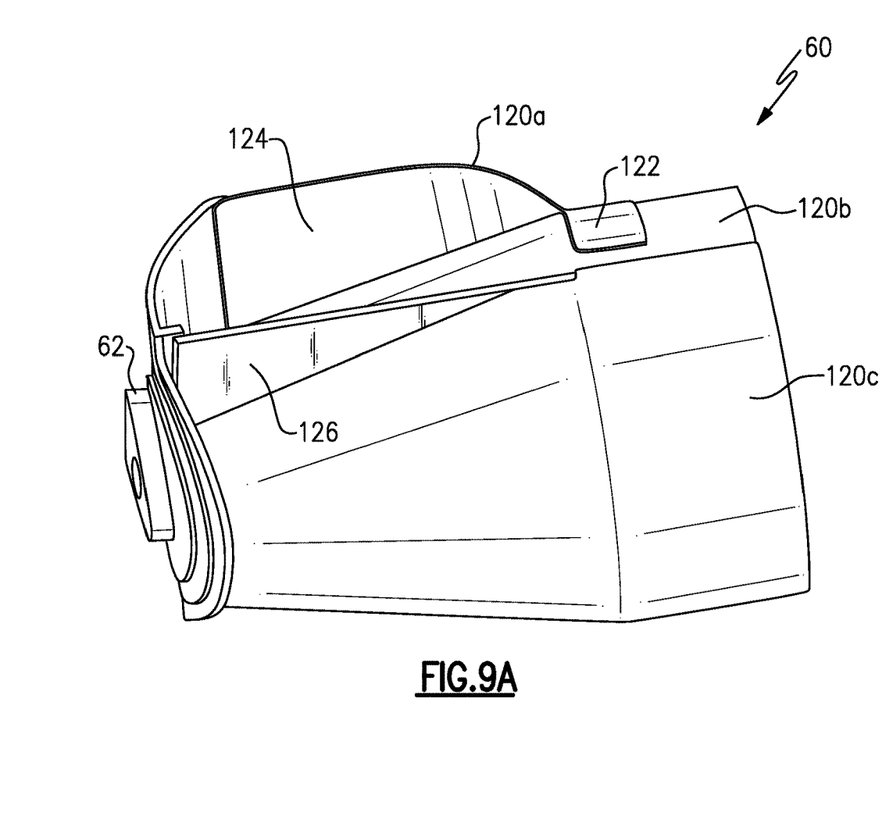
FIG. 9A is a perspective side view of the inlet reactor.
Figure 9B:
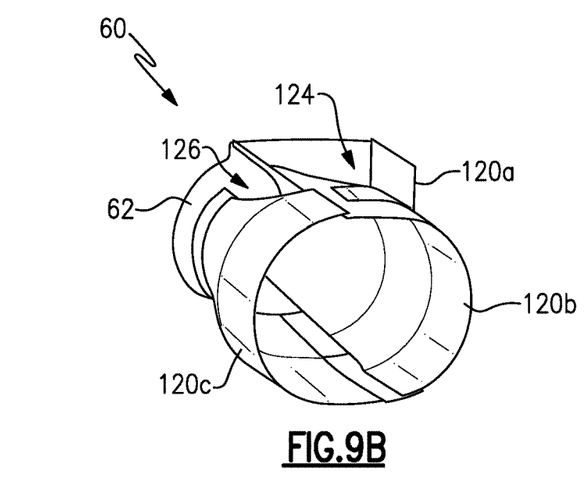
FIG. 9B is an end view of the inlet reactor of FIG. 9A.
Figure 9C:
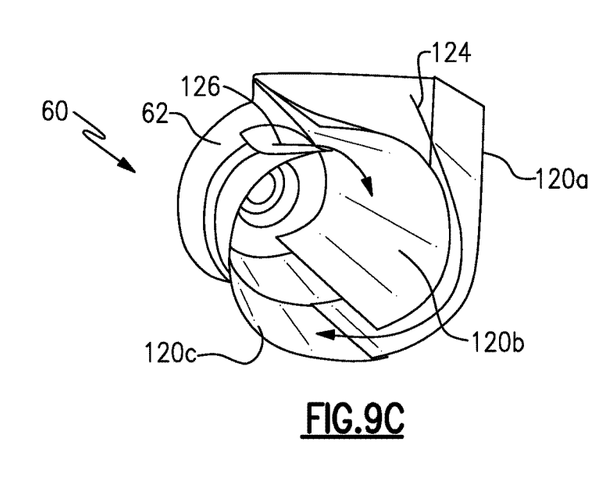
FIG. 9C is a section view of the inlet reactor of FIG. 9B.

The second flow element 120b forms one portion of the swirl chamber and the third flow element 120c forms a remaining portion of the swirl chamber. The second 120b and third 120c flow elements are fixed to each other to substantially surround the doser axis A. The first flow element 120a has an arm portion 122 at the downstream end 82 that is fixed to one of the second 120b and third 120c flow elements and the upstream end 80 of the first flow element 120a is seated against the first flange 110. In one example, a first open space 124 is created between an outer surface of the second flow element 120b and an inner surface of the first flow element 120a. A second open space 126 is created between an inner surface of the second flow element 120b and an outer surface of the third flow element 120c. Exhaust gas flowing through the first 124 and second 126 open spaces, as shown in FIG. 9C, facilitates the creation of a swirling motion within the swirl chamber 64 to thoroughly mix the exhaust gas with the injected fluid.

An exemplary method of assembly the mixer 30 includes the following steps. A plurality of mixer shells are provided with each shell having an internal cavity 56 that surrounds a mixer axis and where each shell includes a doser opening 66. The plurality of mixer shells have different sizes. A single doser mount 62 is provided as a single-piece structure that has a curved body having an outer surface 86 with a plurality of mating surfaces 72, 76 to receive different size mixer shells. One of the plurality of mixers shells having a desired size is selected, and the doser mount 62 is installed from within the internal cavity 56 of the selected shell to extend at least partially outward of the doser opening 66. Then the selected mixer shell is fixed to one of the plurality of matting surfaces that corresponds to the desired size.

The doser mount 62 is used to accurately locate all of the sheet metal pieces of the flow elements 120, while also being used to attach the inlet reactor 60 to the mixer shell and to the mount the doser 36. As discussed above, the doser mount 62 is designed to allow one common doser mount component to be attached to different mixer diameters. The doser mount 62 is provided with multiple curved surfaces that will each mate with a specific mixer shell inside diameter. Installing the doser mount 62 from the inside of the mixer 30 is important because, by staggering these multiple curved surfaces so that the largest curvature is on top of the smaller curvatures, a single doser mount can be used to mate with different diameter mixer shells by increasing the mixer shell interface opening as the mixer shell curvatures decrease.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A component for a mixer of a vehicle exhaust system comprising:
   a doser mount comprising a curved body having a center boss with a doser opening defining a doser axis, wherein the curved body includes at least a first mating surface configured to receive a first mixer shell defined by a first dimension to provide a first mixer type and a second mating surface configured to receive a second mixer shell defined by a second dimension different than the first dimension to provide a second mixer type different than the first mixer type, and wherein the first mixer shell and the second mixer shell each comprise an outer mixer housing that defines an internal cavity which surrounds a mixer center axis that is non-concentric with the doser axis.

2. The component according to claim 1, wherein the second dimension is greater than the first dimension.

3. The component according to claim 2, wherein the first dimension comprises an inner diameter of the first mixer shell and the second dimension comprises an inner diameter of the second mixer shell.

4. The component according to claim 2, wherein the center boss includes a flat surface that is spaced from the curved body by a shoulder, and wherein the flat surface comprises an attachment interface for a doser configured to inject a fluid through the doser opening.

5. The component according to claim 4, wherein the first mating surface of the curved body has a first curvature and the second mating surface of the curved body has a second curvature that is greater than the first curvature, and wherein the first and second mating surfaces are staggered such that the second mating surface is radially inward of the first mating surface relative to the doser axis.

6. The component for a mixer according to claim 1, wherein either the first mixer shell or the second mixer shell is mounted to the doser mount to provide the outer mixer housing that defines the internal cavity for the mixer.

7. A component for a mixer of a vehicle exhaust system comprising:
   a doser mount comprising a curved body having a center boss with a doser opening defining a doser axis, wherein the curved body includes at least a first mating surface configured to receive a first mixer shell defined by a first dimension to provide a first mixer type and a second mating surface configured to receive a second mixer shell defined by a second dimension greater than the first dimension to provide a second mixer type different than the first mixer type, wherein the first dimension comprises an inner diameter of the first mixer shell and the second dimension comprises an inner diameter of the second mixer shell, and wherein the doser mount comprises a single mount to which either the first or second mixer shell is mounted.

8. A component for a mixer of a vehicle exhaust system comprising:

a doser mount comprising a curved body having a center boss with a doser opening defining a doser axis, wherein the curved body includes at least a first mating surface configured to receive a first mixer shell defined by a first dimension to provide a first mixer type and a second mating surface configured to receive a second mixer shell defined by a second dimension greater than the first dimension to provide a second mixer type different than the first mixer type, and wherein the center boss includes a flat surface that is spaced from the curved body by a shoulder, and wherein the flat surface comprises an attachment interface for a doser configured to inject a fluid through the doser opening, and wherein each of the first and second mixer shells define a mixer center axis, and including a second shoulder that separates the center boss from the second mating surface and a third shoulder that separates the second mating surface from the first mating surface such that the second mating surface is radially outward of the first mating surface relative to the mixer center axis.

9. A component for a mixer of a vehicle exhaust system comprising:
a doser mount comprising a curved body having a center boss with a doser opening defining a doser axis, wherein the curved body includes at least a first mating surface configured to receive a first mixer shell defined by a first dimension to provide a first mixer type and a second mating surface configured to receive a second mixer shell defined by a second dimension different than the first dimension to provide a second mixer type different than the first mixer type; and
a plurality of flow elements each having an upstream end fixed to the doser mount and a downstream end, and wherein the plurality of flow elements are attached to each other to form a swirl chamber, and wherein each flow element provides a curved inwardly facing surface that forms at least a portion of an inner peripheral wall of the swirl chamber.

10. A component for a mixer of a vehicle exhaust system comprising:
a doser mount comprising a curved body having a center boss with a doser opening defining a doser axis, wherein the curved body includes at least a first mating surface configured to receive a first mixer shell defined by a first dimension and a second mating surface configured to receive a second mixer shell defined by a second dimension different than the first dimension;
a plurality of flow elements each having an upstream end fixed to the doser mount and a downstream end, and wherein the plurality of flow elements are attached to each other to form a swirl chamber; and
wherein the plurality of flow elements comprise at least first, second, and third flow elements, and wherein the doser mount includes at least a first flange area extending in an opposite direction from the center boss and at least partially surrounding the doser opening and a second flange area extending at least partially about a peripheral edge of the curved body, and where in the upstream ends of the first and second flow elements are associated with the first flange area and the upstream end of the third flow element is associated with the second flange area.

11. The component according to claim 10, wherein the first flow element forms one portion of a swirl chamber and the second flow element forms a remaining portion of the swirl chamber, the first and second flow elements fixed to each other to surround the doser axis, and wherein the third flow element has an arm portion at the downstream end that is fixed to one of the first and second flow elements and the upstream end of the third flow element is seated against the second flange area, and wherein a first open space is created between an outer surface of the second flow element and an inner surface of the third flow element and a second open space is created between an outer surface of the first flow element and an inner surface of the second flow element.

12. A vehicle exhaust system component comprising:
a mixer having an upstream end configured to be connected to an upstream exhaust component and a downstream end configured to be connected to a downstream component, the mixer having a mixer shell providing an internal cavity that surrounds a mixer center axis, and wherein the mixer shell has a doser opening;
a doser mount mounted to the mixer at the doser opening, wherein the doser mount is configured to support a doser that injects a fluid into the internal cavity of the mixer shell, and wherein the doser mount comprises a curved body having a center boss with a doser mount opening defining a doser axis, wherein the curved body includes at least a first mating surface configured to receive a first mixer shell defined by a first dimension and a second mating surface configured to receive a second mixer shell defined by a second dimension, and wherein the doser mount comprises a single mount to which either the first or second mixer shell is mounted to provide the mixer shell; and
a swirl chamber having an upstream end fixed to the doser mount and a downstream end that is open to the internal cavity, and wherein the upstream end is defined by a first outer dimension and the downstream end is defined by a second outer dimension that is greater than the first outer dimension.

13. The vehicle exhaust system component according to claim 12, wherein the doser mount has an outer surface that faces an inner surface of the mixer shell and an inner surface that faces the internal cavity, and wherein the first mating surface of the curved body has a first curvature in the outer surface and the second mating surface of the curved body has a second curvature in the outer surface that is greater than the first curvature, and wherein the first and second mating surfaces are staggered such that the second mating surface is radially inward of the first mating surface relative to the doser axis.

14. The vehicle exhaust system component according to claim 13, wherein the center boss includes a flat surface that is spaced from the curved body by a shoulder, and wherein the flat surface comprises an attachment interface for the doser.

15. The vehicle exhaust system component according to claim 14, including a second shoulder that separates the center boss from the second mating surface and a third shoulder that separates the second mating surface from the first mating surface such that the second mating surface is radially outward of the first mating surface relative to the mixer center axis.

16. The vehicle exhaust system component according to claim 13, wherein the swirl chamber is comprised of a plurality of sheet metal stampings each having an upstream end fixed to one or more flanges extending inwardly of the inner surface of the doser and a downstream end that extends into the internal cavity.

17. The vehicle exhaust system component according to claim 12, wherein either the first shell is mounted to the single mount to provide a first mixer type or the second mixer shell is mounted to the single mount to provide a second mixer type that is different than the first mixer type.

18. The vehicle exhaust system component according to claim 17, wherein the second dimension is greater than the first dimension, and wherein the first dimension comprises an inner diameter of the first mixer shell and the second dimension comprises an inner diameter of the second mixer shell such that the first mixer type comprises a first mixer size and the second mixer type comprises a second mixer size greater than the first mixer size.

19. A method of assembling a mixer for a vehicle exhaust system comprising:
provide a plurality of mixer shells each having an internal cavity that surrounds a mixer axis and each having a doser opening, and wherein the plurality of mixer shells have different sizes;
providing a single doser mount having a curved body with a plurality of mating surfaces to receive different size mixer shells;
selecting one of the plurality of mixers shells having a desired size;
installing the doser mount from within the internal cavity of a selected one of the plurality of mixer shells such that the doser mount extends at least partially outward of the doser opening; and
fixing the selected one of the plurality of mixer shells to one of the plurality of mating surfaces that corresponds to the desired size.

20. The method according to claim 19, wherein the plurality of mixer shells have at least a first mixer shell defined by a first dimension and a second mixer shell that is defined by a second dimension that is different from the first dimension, and wherein the plurality of mating surfaces includes at least a first mating surface configured to receive the first mixer shell and a second mating surface configured to receive the second mixer shell, and including defining the first dimension as an inner diameter of the first mixer shell and the second dimension as an inner diameter of the second mixer shell.

21. The method according to claim 20, wherein the doser mount has an outer surface that faces an inner surface of the selected one of the plurality of mixer shells and an inner surface that faces the internal cavity, and providing the first mating surface of the curved body with a first curvature in the outer surface and the second mating surface of the curved body with a second curvature in the outer surface that is greater than the first curvature, and including staggering the first and second mating surfaces such that the second mating surface is radially inward of the first mating surface relative to a doser axis defined by the doser opening.

22. The method according to claim 21, wherein the center boss includes a flat doser attachment surface in the outer surface that is spaced from the curved body by a shoulder, and including positioning the doser mount such that the center boss extends outwardly of the doser opening in the selected one of the plurality of mixer shells.

23. The method according to claim 21, including installing a swirl chamber within the internal cavity, the swirl chamber being comprised of a plurality of flow elements each having an upstream end fixed to one or more flanges extending inwardly of the inner surface of the doser and a downstream end that extends into the internal cavity, and wherein each flow element provides a curved inwardly facing surface that forms at least a portion of an inner peripheral wall of the swirl chamber.

24. The method according to claim 20, including either
mounting the first mixer shell to the single doser mount to provide a first mixer having a first size, or
mounting the second mixer shell to the single doser mount to provide a second mixer having a second size that is greater than the first size.

25. A component for a mixer of a vehicle exhaust system comprising:
a doser mount comprising a curved body having a center boss with a doser opening defining a doser axis, wherein the curved body includes at least a first mating surface configured to receive a first mixer shell defined by a first dimension to provide a first mixer type and a second mating surface configured to receive a second mixer shell defined by a second dimension different than the first dimension to provide a second mixer type different than the first mixer type, and wherein the doser mount comprises a single mount to which either the first shell is mounted to provide the first mixer type or the second mixer shell is mounted to provide the second mixer type.

26. The component for a mixer according to claim 25, wherein the first dimension comprises an inner diameter of the first mixer shell and the second dimension comprises an inner diameter of the second mixer shell that is greater than the inner diameter of the first mixer shell such that the first mixer type comprises a first mixer size and the second mixer type comprises a second mixer size greater than the first mixer size.

* * * * *